(12) United States Patent
Li et al.

(10) Patent No.: US 9,445,007 B1
(45) Date of Patent: Sep. 13, 2016

(54) DIGITAL ZOOM METHODS AND SYSTEMS

(71) Applicant: QUALCOMM Incorporated, San Diego, CA (US)

(72) Inventors: Feng Li, San Diego, CA (US); Shu Fei Fan, San Diego, CA (US); Shilpi Sahu, Bangalore (IN); Min Li, San Diego, CA (US); Yunqiang Chen, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/631,588

(22) Filed: Feb. 25, 2015

(51) Int. Cl.
*H04N 5/228* (2006.01)
*H04N 5/232* (2006.01)
*G06T 3/40* (2006.01)
*G06T 5/00* (2006.01)

(52) U.S. Cl.
CPC ......... *H04N 5/23296* (2013.01); *G06T 3/4007* (2013.01); *G06T 5/003* (2013.01)

(58) Field of Classification Search
CPC ........... H04N 5/23296; H04N 5/2628; H04N 5/23293; H04N 1/00307
See application file for complete search history.

(56) References Cited

U.S. PATENT DOCUMENTS

| | | | |
|---|---|---|---|
| 5,889,894 A * | 3/1999 | Ito | G06T 3/4007 358/1.9 |
| 7,733,389 B2 | 6/2010 | Kurosawa et al. | |
| 8,488,024 B2 | 7/2013 | Yano et al. | |
| 8,605,172 B2 | 12/2013 | Nikkanen et al. | |
| 8,704,917 B2 | 4/2014 | Rodriguez et al. | |
| 2003/0179953 A1* | 9/2003 | Ishizaka | G06T 3/403 382/298 |
| 2006/0115176 A1* | 6/2006 | Kanamori | G06T 5/003 382/266 |
| 2007/0019104 A1* | 1/2007 | Inoue | H04N 5/23212 348/345 |
| 2008/0278602 A1 | 11/2008 | Otsu | |
| 2010/0278422 A1* | 11/2010 | Iketani | G06T 3/403 382/165 |
| 2015/0071563 A1* | 3/2015 | Park | G06T 5/007 382/274 |

* cited by examiner

*Primary Examiner* — Amy Hsu
(74) *Attorney, Agent, or Firm* — Knobbe, Martens, Olson & Bear, LLP

(57) ABSTRACT

In some cases, conventional digital zoom techniques can lead to poor quality images. Disclosed are systems and methods for improving the quality of images generated by digital zoom. For example, in some embodiments, a parallel structure is utilized where an image is passed through a sharpener and a 2D directional upscaler at the same time. Upscaling operations are then performed on the sharpened image. The upscaled sharpened image is added to the output of the 2D directional upscaler to produce an enhanced image.

30 Claims, 18 Drawing Sheets

DIGITAL ZOOM METHODS AND SYSTEMS

BACKGROUND

1. Field

The present application relates generally to image processing, and more specifically to methods and systems for enhancing digital zoom.

2. Description of the Related Art

A zooming feature of an imaging system (for example, a camera) allows the system to change smoothly from a long shot of a scene to a close-up shot, and vice-versa. In other words, zooming decreases and/or narrows the apparent angle view of a digital photograph or video.

There are generally two types of zooms for cameras. One type of zoom is an optical zoom. Optical zoom may use a real zoom lens and/or a prime telephoto lens. Because these lenses allow cameras to physically focus in on targets, optical zooms can produce zoomed images without losing image quality. Digital zoom allows cameras to zoom without having to physically focus lenses. The technology enlarges a portion of the original image using image processing.

One challenge with present digital zoom technologies is that they produce low-quality images. In some cases, these technologies cause images to have jaggy edges, blurred details, overly smoothened edges, image artifacts, and/or washed-out appearances. Accordingly, because of the shortcomings of current digital zoom technologies, there is a need for more effective systems and methods for digital zoom.

SUMMARY

In some cases, present digital zoom technologies produce low-quality images. The present application relates to systems and methods for enhancing the quality of images produced by digital zoom.

Accordingly, one aspect relates to an imaging system, comprising: an image upscaling module configured to receive an input image comprising a plurality of pixels that have corresponding pixel values (which may also referred to as "pixel colors" throughout this disclosure), and to generate an upscaled output image by enlarging the input image to a defined size and interpolating a defined number of pixels between each pixel of the input image; a sharpening module configured to generate a sharpened image by amplifying differences in pixel value of the pixels of the input image; a sharpening upscaling module configured to: upscale the sharpened image by enlarging the sharpened image to the defined size and interpolating the defined number of pixels between each pixel of the sharpened image, generate a first delta image, each pixel of the first delta image corresponding to each pixel of the upscaled output image, and each pixel of the first delta image comprising a first change in pixel value based on at least the upscaled sharpened image and a first gain factor, generate a second delta image, each pixel of the second delta image corresponding to each pixel of the upscaled output image, and each pixel of the second delta image comprising a second change in pixel value based on at least the upscaled sharpened image and a second gain factor, and generate a third delta image, each pixel of the third delta image corresponding to each pixel of the upscaled output image, and each pixel of the third delta image comprising a third change in pixel value based on at least the first delta image and the second delta image; and a processing module configured to generate an enhanced image based on adding the pixel values of the corresponding pixels of the upscaled image and the third delta image.

Another aspect relates to an imaging method, comprising: receiving an image comprising a plurality of pixels, wherein each pixel has a corresponding pixel value; generating an upscaled output image by enlarging the image to a defined size and interpolating a defined number of pixels between each pixel of the image; generating a sharpened image by amplifying differences in pixel value of the pixels of the image; upscaling the sharpened image by enlarging the sharpened image to the defined size and interpolating the defined number of pixels between each pixel of the sharpened image; generating a first delta image, wherein each pixel of the first delta image corresponds to each pixel of the upscaled output image, and each pixel of the first delta image comprises a first change in pixel value based on at least the upscaled sharpened image and a first gain factor; generating a second delta image, wherein each pixel of the second delta image corresponds to each pixel of the upscaled output image, and each pixel of the second delta image comprises a second change in pixel value based on at least the upscaled sharpened image and a second gain factor; generating a third delta image, wherein each pixel of the third delta image corresponds to each pixel of the upscaled output image, and each pixel of the third delta image comprises a third change in pixel value based on at least the first delta image and the second delta image; and generating an enhanced image based on adding the pixel values of the corresponding pixels of the upscaled image and the third delta image.

Another aspect relates to an imaging system, comprising: means for receiving an image comprising a plurality of pixels, wherein each pixel has a corresponding pixel value; means for generating an upscaled output image by enlarging the image to a defined size and interpolating a defined number of pixels between each pixel of the image; means for generating a sharpened image by amplifying differences in pixel value of the pixels of the image; means for upscaling the sharpened image by enlarging the sharpened image to the defined size and interpolating the defined number of pixels between each pixel of the sharpened image; means for generating a first delta image, wherein each pixel of the first delta image corresponds to each pixel of the upscaled output image, and each pixel of the first delta image comprises a first change in pixel value based on at least the upscaled sharpened image and a first gain factor; means for generating a second delta image, wherein each pixel of the second delta image corresponds to each pixel of the upscaled output image, and each pixel of the second delta image comprises a second change in pixel value based on at least the upscaled sharpened image and a second gain factor; means for generating a third delta image, wherein each pixel of the third delta image corresponds to each pixel of the upscaled output image, and each pixel of the third delta image comprises a third change in pixel value based on at least the first delta image and the second delta image; and means for generating an enhanced image based on adding the pixel values of the corresponding pixels of the upscaled image and the third delta image.

Another aspect relates to an imaging method, comprising: receiving an image comprising a plurality of pixels, wherein each pixel has a corresponding pixel value; generating an upscaled output image by enlarging the image to a defined size and interpolating a defined number of pixels between each pixel of the image; generating a sharpened portion of the image by amplifying differences in pixel value of the pixels of the image; generating a delta image comprising a plurality of delta pixels, wherein each pixel has a corresponding change in pixel value between the sharpened image and the image; upscaling the delta image by enlarging the delta image to the defined size and interpolating the defined number of pixels between each pixel of the sharpened image; and generating an enhanced image based on adding the pixel values of the corresponding pixels of the upscaled image and the delta image.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Various aspects of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting. The scope of the disclosure is defined by the appended claims and equivalents thereof.

Figure 1A:
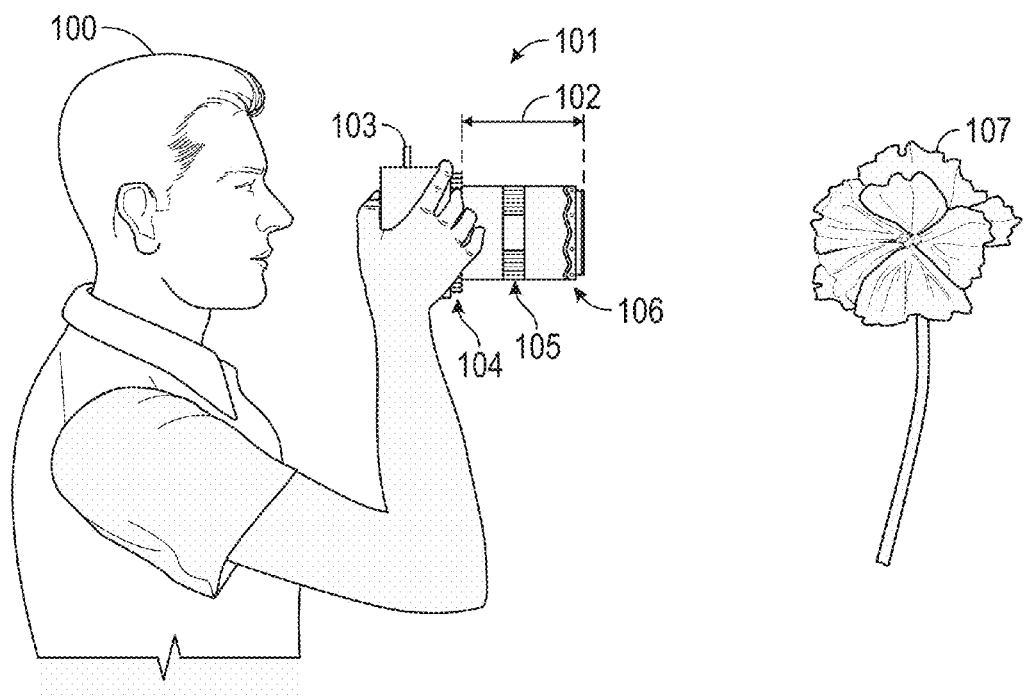
FIG. 1A is an illustration of a person using an example camera with an optical zoom lens.

FIG. 1A is an illustration of a person using an example camera with an optical zoom lens. Person 100 is taking a picture of flower 107 using camera 101. Camera 101 is a camera (e.g., a digital single-lens reflex (DSLR) camera or a single-lens reflex (SLR) camera) with optical zoom lens 102. The optical zoom lens 102 may have various physical dials, such as dials 105 and 106, which are used to adjust the focus and range of the zoom. The optical zoom lens 102 may also connect to the camera body 103 by connector 104. Through connector 104, the optical zoom lens 102 may be detached or attached, and/or replaced by other lenses, including other optical zoom lenses.

Figure 1B:
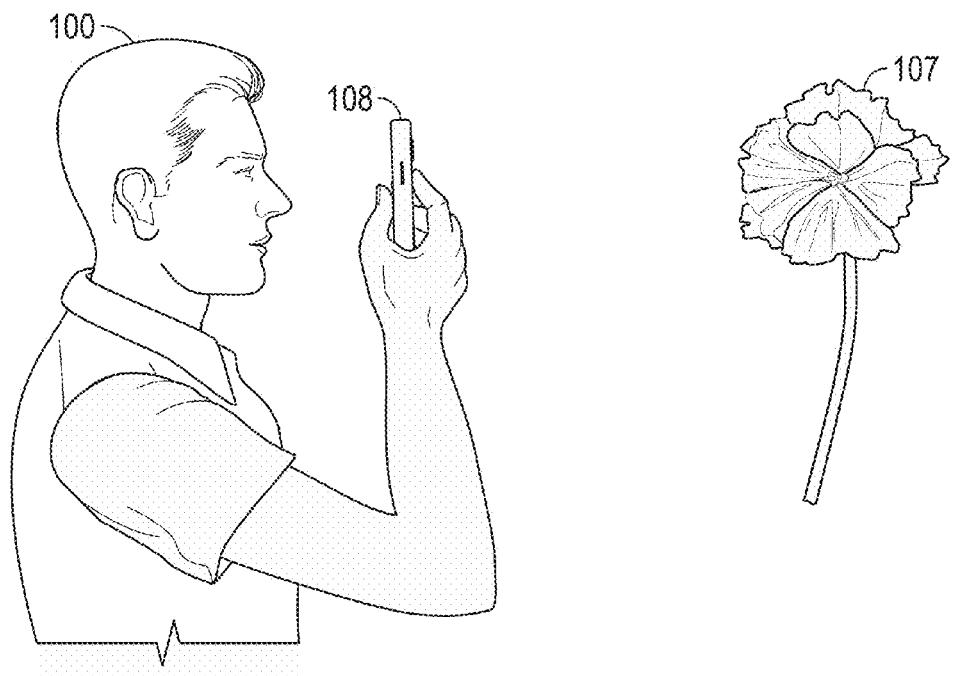
FIG. 1B is an illustration of a person using an example device with limited optical zoom capabilities.

In contrast, FIG. 1B is an illustration of a person using an example device with limited optical zoom capabilities. Person 100 is using camera phone 108 to take a picture of flower 107. Noticeably, camera phone 108 does not have a large optical zoom lens, such as optical zoom lens 102 illustrated in FIG. 1A.

Figure 2:
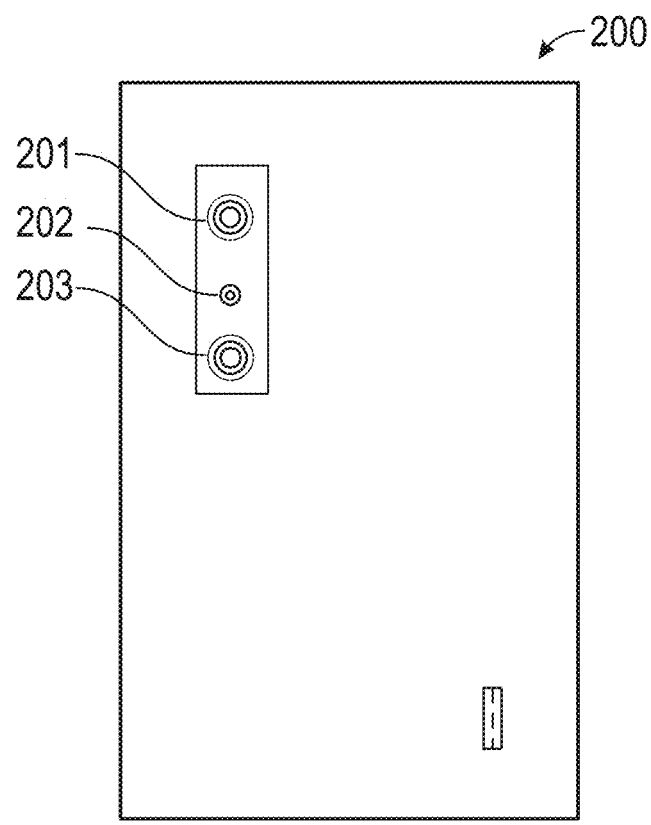
FIG. 2 is an enlarged illustration of the example device with limited optical zoom capabilities from FIG. 1B.

FIG. 2 is an enlarged illustration of the example device with limited optical zoom capabilities from FIG. 1B. The camera phone 200 has dual cameras 201 and 203. In some cases, cameras 201 and 203 can be between four (4) and five (5) millimeters in size. Also, in some cases, cameras 201 and 203 cannot be altered for an optical zoom (e.g., they do not have optical zoom capabilities). In some embodiments, cameras 201 and 203 (which may include camera bodies and lenses) may be modules that can be swapped and/or replaced in the device. Flashbulb 202 may be used with cameras 201 and 203 to provide flash lighting for photography.

It should be understood by one of ordinary skill in the art that this disclosure is not limited to camera phones. Other devices may also have limited or no optical zoom capabilities due to, for example, space, cost, or hardware constraints. For example, tablets and other mobile devices do not have space for a large optical zoom lens. Also, in some cases, even when cameras do use an optical zoom lens, optical zoom capabilities are still limited. For example, certain compact cameras have physical lenses that can be used for optical zooming. However, the amount of zooming through these optical lenses is limited. These cameras can increase the amount of zoom by using a combination of both optical and digital zooms. For example, a camera with a 4× optical zoom and a 4× digital zoom can generate a 16× zoom. This disclosure is also not limited to devices that use dual cameras, but is also applicable to devices with only a single camera and devices with more than two cameras. For example, there may also be additional cameras, including 3, 4, 5, 6, 7, 8, 9, 10, 11, 12, 13, 14, 15, 16, 17, 18, 19, and/or 20 cameras, or a number of cameras greater 20 cameras. For example, the cameras may be arranged in a 4×4 array. The cameras may also be arranged in a multiple/hybrid camera design. In some cases, these multiple cameras and/or lenses may be used to generate a single image, which may then be processed by systems and methods of this disclosure. In other cases, the multiple cameras and/or lenses may generate multiple images that may similarly be processed by systems and methods of this disclosure.

Also, in some cases, the image may be 2D whereas in other cases, the image may be 3D. Images may also be taken over time and/or be part of a video and/or recording. Systems and methods of this disclosure may be used on any such images.

Figure 3:
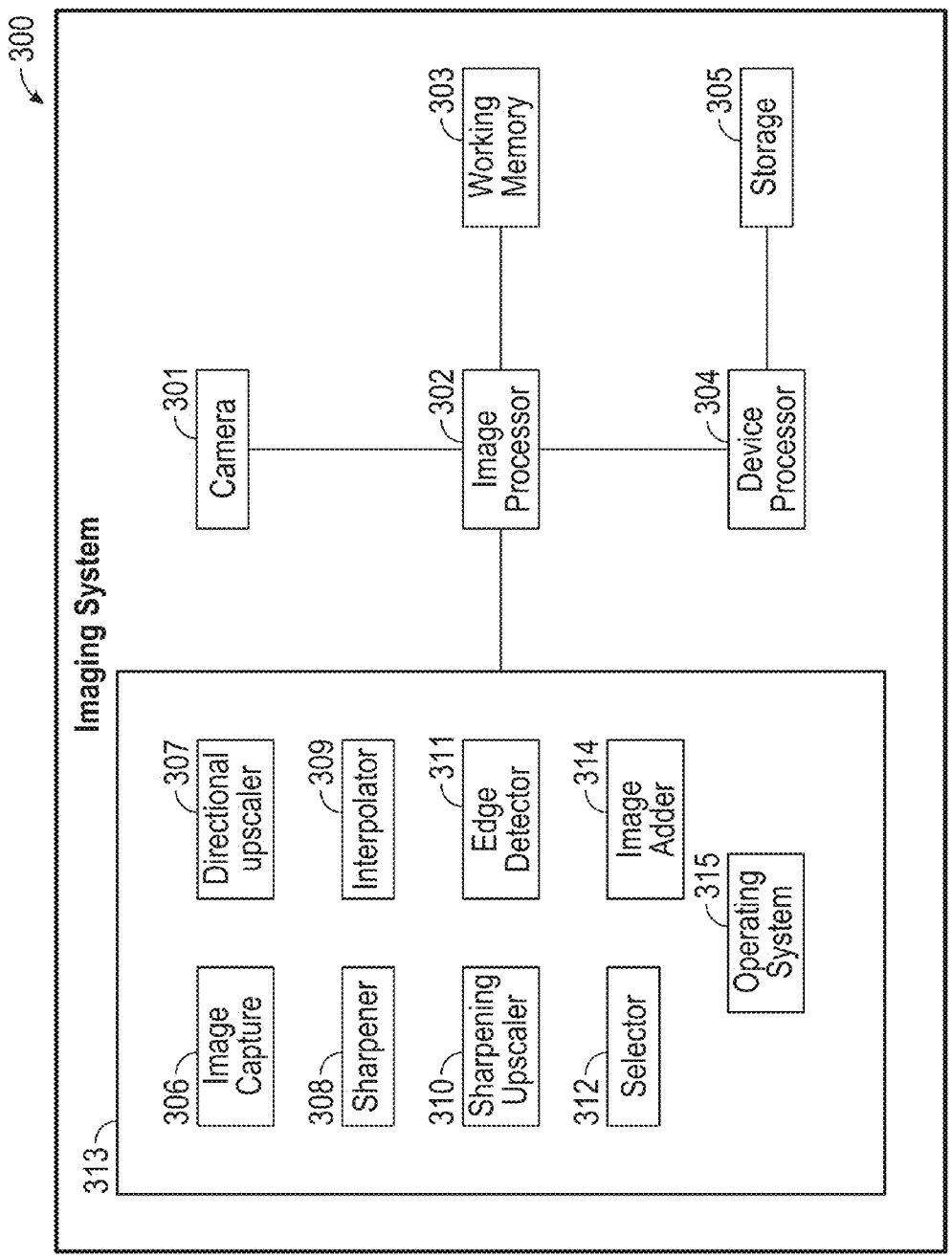
FIG. 3 illustrates an example of a functional block diagram of an embodiment of an imaging system.

FIG. 3 illustrates an example of a functional block diagram of an embodiment of an imaging system. Imaging system 300 includes a camera 301, which can be a module that can be removed and/or swapped out of camera device 300. It may also be integrated and/or fixed to camera device 300. Camera 301 is connected to image processor 302. Image processor 302 controls the basic operations that analyze images from camera 301. Image processor 302 is in communication with device processor 304, which is in communication with storage 305.

In addition, image processor 302 may be coupled with working memory 303, which may include both read-only memory (ROM) and random access memory (RAM), and may provide instructions and data to image processor 302. A portion of working memory 303 may include non-volatile random access memory (NVRAM). Image processor 302 typically performs logical and arithmetic operations based on program instructions stored within working memory 303. Instructions in working memory 303 may be executable to implement the methods described herein. Modules in components 313 may be coupled to image processor 302 in order to perform operations such as image capture, directional upscaling, sharpening, interpolation, sharpening upscaling, edge detection, image selection, and/or image addition.

For example, module component 306 is an image capture module that may be used to obtain an image from camera 301. Module component 307 is a directional upscaler, which may enlarge and/or stretch an image. In some cases, module component 307 may also interpolate pixels between the original pixels of the image as it enlarges and/or stretches the image. One of ordinary skill in the art should appreciate that component 313 may also contain any number of other upscalers, which enlarge and/or stretch an image. For example, it may contain 2D generic upscalers, such as bi-cubic, bilinear, and nearest-neighbor interpolators. It may also contain an edge adaptive 2D upscaler.

Module component 308 is a sharpener, which enhances the pixel value differences between adjoining areas of an image. In some cases, module component 308 uses a high pass filter for sharpening.

Module component 309 is an interpolator, which adds additional pixel information between pixels of an image. Module component 310 is a sharpening upscaler. As will be further described in this application, this module performs operations to enhance and upscale a sharpened image.

Module component 311 is an edge detector, which can detect places of color transition in an image. In some embodiments, module component 311 can generate an edge strength map, which computes the amount (in relative or absolute values) of transition between pixels. Module component 312 is a selector, which can be used to select a particular portion of an image for viewing and/or enhancement. Module component 314 is an image adder. It can be used to add images together. For example, the image adder may be a processor that adds together the pixel values of pixels from two different images to form a third image. Module component 315 is an operating system. It may be used to configure image processor 302 to manage the working memory 303 and the processing resources of camera device 300. For example, module component 315 may include device drivers to manage hardware resources in example camera 301. Module component 315 may further configure the image processor 302 to share information with device processor 304.

A person having ordinary skill in the art should appreciate that there are various implementations of imaging system/camera device technology. These different types of imaging systems may have different ways of capturing images. For example, cameras may capture images digitally or in analog (e.g., film or polaroid). Cameras may capture pictures and/or video. They may have telescopic lenses, zooming lenses, and/or standard lenses. They may also vary in the type of features that they use, such as slow-motion capture, light adjusters, panoramic modes, time lapse videos, and/or night vision. This disclosure is not limited to any particular type of camera device and/or camera devices with specific sets of features.

In some cases, embodiments in this disclosure may be used without a camera at all. For example, certain embodiments may process previously captured images in stand-alone programs, hardware, and/or electronic applications.

Figure 4:
FIG. 4 is an example illustrating the pixels of an image.

FIG. 4 is an example illustrating the pixels of an image. Image 400 is a photograph. It consists of pixels, or picture elements, which are addressable elements of image 400. Each pixel has an associated color. It is the combination of these colors by these pixels that creates what can be seen as flowers and grass in image 400. Another way to represent image 400 is as a matrix. By way of illustration, matrix 401 is a representative matrix where each entry in the matrix corresponds to a pixel in an image (or in a portion of an image).

Also by way of illustration, an image could have 600×400 pixels. In such a case, the image could be represented by a matrix with 600 rows and 400 columns. Each entry of the matrix could then be addressable by its row number and column number. For example, row 10, column 100 would address one entry in the matrix, and row 20, column 50 would address another entry in the matrix. Each entry of the matrix may also reflect the color of the corresponding pixel in the image. The entries may take different forms. For example, each entry could actually comprise of three values representing the relative red, green, and blue composition of a pixel. In other cases, each entry could be a scaled number between zero (0) and one (1), reflecting a color and/or color intensity. In other cases each entry may be a number in any range of numbers reflecting different colors. In other cases, the entries may be letters and/or numbers that correspond to particular colors and/or color intensities. A person having ordinary skill in the art should appreciate that the color of a pixel of an image could be represented in any number of ways. In this disclosure, any way of representing the color, color intensity, and/or any other attribute of an image pixel (e.g., hue, contrast, brightness, shade, grayscale, etc.) will be called a "pixel value" or a "pixel color." Furthermore, embodiments of this disclosure are not limited to any way of storing and/or representing pixel values (or colors) in an image.

Figure 5:
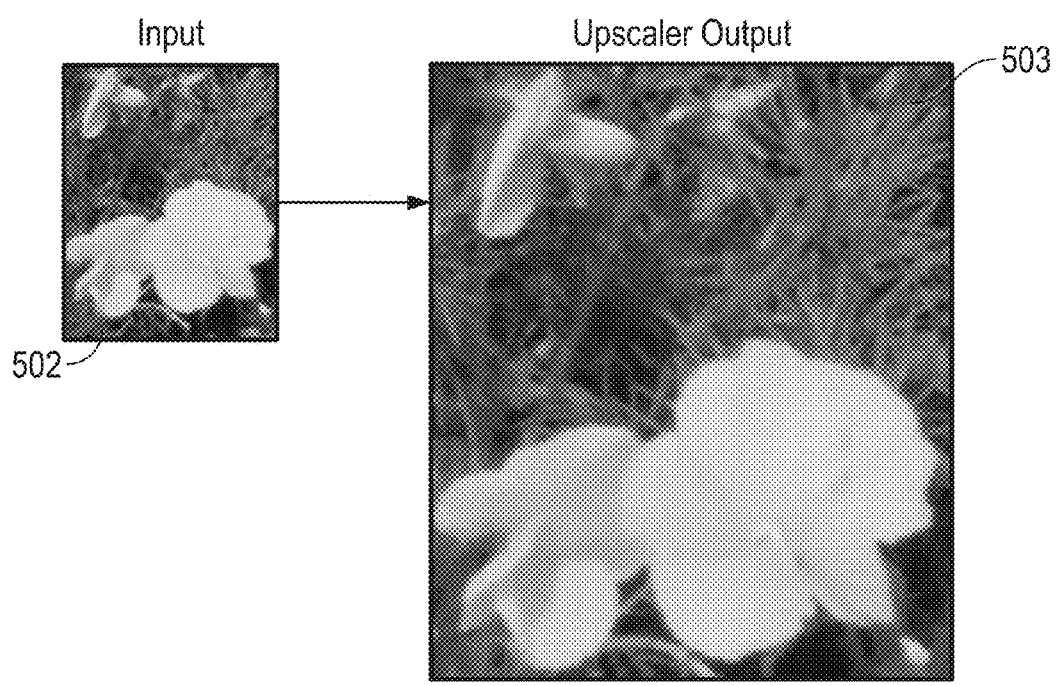
FIG. 5 is an example illustrating the upscaling of an image.

FIG. 5 is an example illustrating the upscaling of an image. When optical zoom capabilities are used, lenses of the camera may be physically changed in order to generate an image that includes more detail of particular areas. However, when digital zoom capabilities are used, a portion of the image captured by the camera may be upscaled to enlarge and/or interpolate additional pixel data between pixels of the image. In some cases, the image may appear in a larger window (e.g., the image is enlarged). For example, a 100×200 pixel image may be upscaled by a factor of two, creating a 200×400 pixel image. In this example, between each adjacent pixel of the original 100×200 pixel image, an additional pixel may be interpolated so that the image enlarges to 200×400 pixels.

In some cases, digital zoom capabilities may be performed in real time by a camera device. In other cases, digital zoom capabilities may be performed on images stored in memory. Upscaled output image 503 represents an upscaled version of input image 502. In this example, the entire input image 502 has been upscaled. However, in some cases, a portion of input image 502 may be upscaled. Some examples of upscaling techniques are nearest-neighbor interpolation, bilinear interpolation, bi-cubic interpolation, and/or directional upscaling.

Figure 6:
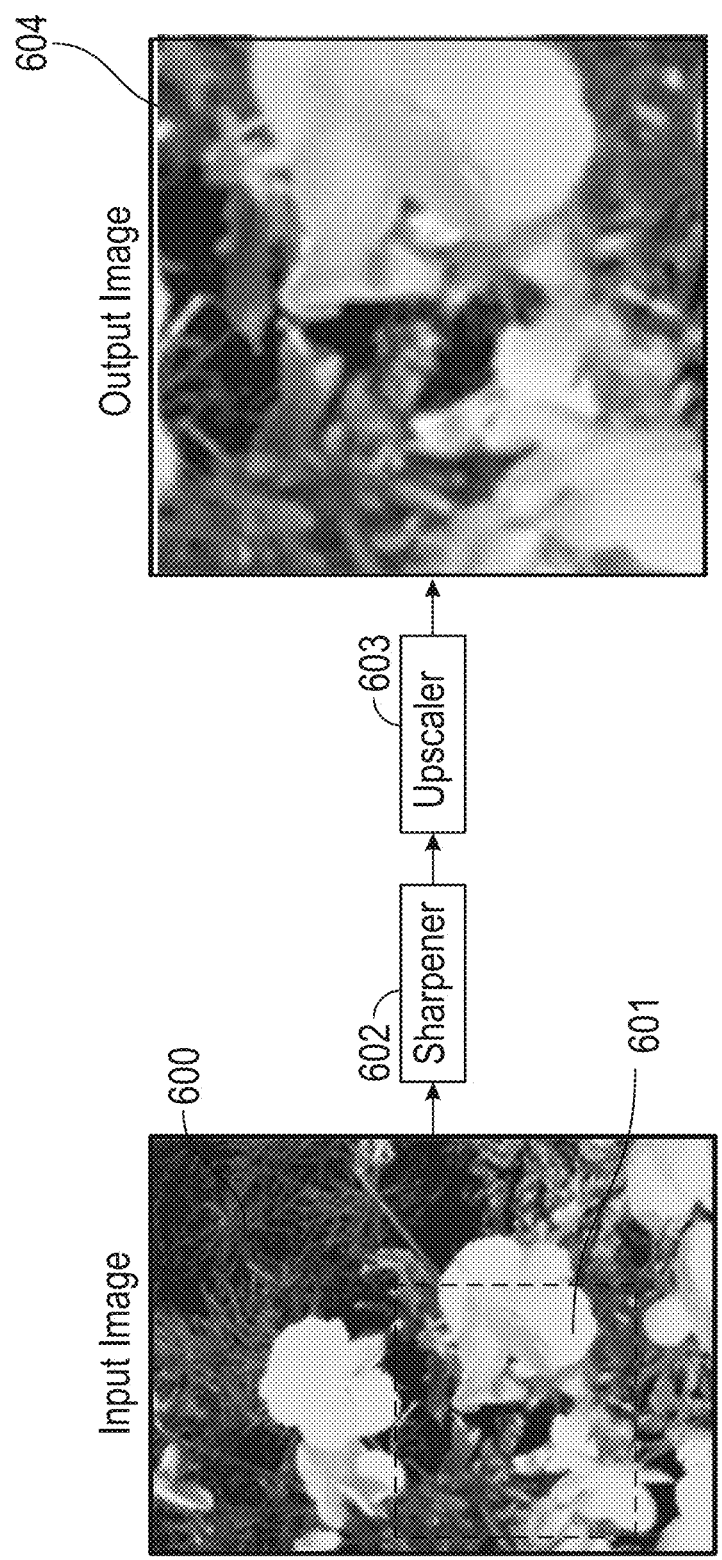
FIG. 6 is an example embodiment where an input image is sharpened and then upscaled.

FIG. 6 is an example embodiment where an input image is sharpened and then upscaled. Input image 600 is an example input image. Within input image 600 is selected region 601, which is a region selected for zooming. Selected region 601 may be a portion of input image 600, the entire input image 600, particular pixels and/or groups of pixels, discontinuous portions and/or pixels of input image 600, and/or any other part and/or collection of parts of input image 600. Selected region 601 is passed to sharpener 602. The output of sharpener 602 is then passed to upscaler 603. Upscaler 603 may be any upscaler mentioned in this disclosure and/or known in the art. In general, upscaler 603 enlarges the output of sharpener 602. For example, upscaler 603 may be a directional upscaler or a symmetric upscaler. The output of upscaler 603 is the output image 604. Output image 604 is an enlarged image of the selected region 601.

The structure of using sharpener 602 and then upscaler 603 is called a "cascading structure" by some skilled in the art. Alternatively, an upscaler may be used first, and then a sharpener. This is also a cascading structure. In some cases, cascading structures lead to output images that are unclear, have excess overshoots, and/or exhibit ringing.

Figure 7:
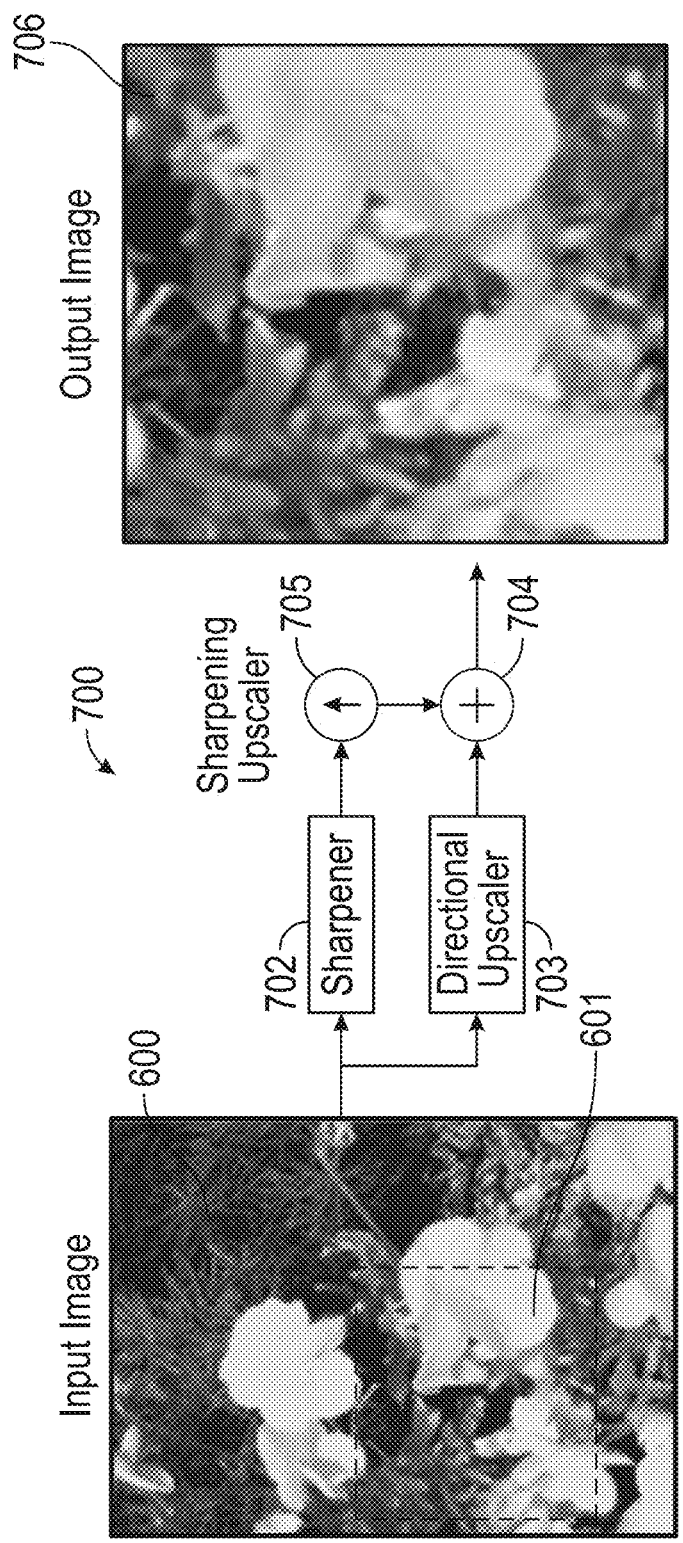
FIG. 7 is an example embodiment with a parallel processing structure that may be used to process an image.

FIG. 7 is an example embodiment with a parallel processing structure that may be used to process an image. Here, input image 600, also illustrated in FIG. 6, is inputted. Similarly, selected region 601 is the region selected for zooming. Selected region 601 is inputted into directional upscaler 703. At the same time, selected region 601 is inputted into sharpener 702. The output of sharpener 702 is inputted into sharpening upscaler 705. The output of sharpening upscaler 705 is then added to the output of directional upscaler 703 using image adder 704. The output of image adder 704 is output image 706.

It should be recognized that any of the systems and methods of this disclosure may relate to images, regions of images, groups of pixels, and/or individual pixels. For example, sharpener 702, sharpening upscaler 705, directional upscaler 703, and image adder 704 may receive and output entire images, regions of images, groups of pixels, and/or individual pixels at a time. Some steps may also involve receiving a delta image or delta value, which include measurements of pixel color differences between one image and another. A person having ordinary skill in the art would recognize that the form of data on which the systems and methods of this disclosure operate may be adjusted and/or changed as desired based on hardware and memory usage, speed, and other considerations relating to the efficiency of algorithms or device resource management. As such, any disclosure of an "image" in this disclosure should be understood to be interchangeable with regions of images, groups of pixels, individual pixels, and/or delta images and delta values.

Figure 8A:
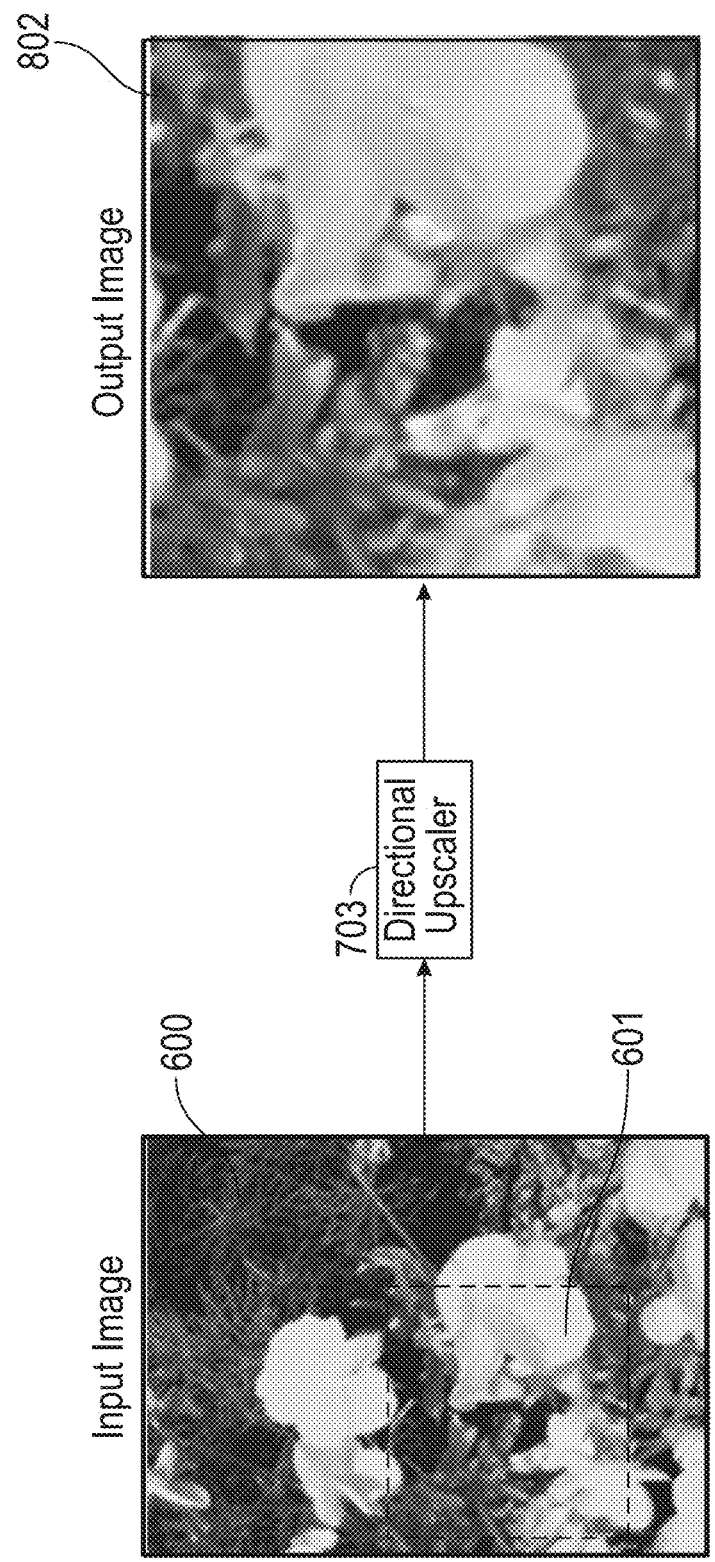
FIG. 8A is an example illustrating the directional upscaling of an input image.

FIG. 8A is an example illustrating the directional upscaling of an input image. Again, selected region 601 of input image 600 is inputted into directional upscaler 703, which may be a 2D directional upscaler and/or any directional upscaler known in the art. As an illustrative example, in some embodiments, directional upscaler 703 uses a window of image pixels. For example, a window of image pixel may be a 4×4 matrix, or a window of any other dimension or shape as desired (e.g., 2×2, 3×3, 2×3, 3×2, 4×2, 2×4, 3×4, 4×3, etc., and/or a square of any dimension, a rectangle of any dimension, a circle of any dimension, a parallelogram of any dimension, a rhombus of any dimension, a triangle of any dimension, a tetrahedron of any dimension, etc.). The window of image pixels sequentially operates on each pixel (and/or interpolated pixel) of selected region 601. As directional upscaler 703 upscales selected region 601, it calculates the edge strength of a pixel of the window of image pixels based on the pixel color of the other pixels in the window of image pixels. In some cases, an edge in an image may be detected at pixels when there is a discontinuity in pixel color at that pixel as compared to the pixel color of surrounding pixels in a window of image pixels. In some cases, a discontinuity may occur when the color of a pixel varies sharply from adjacent pixels. One way of detecting an edge is by employing an edge filter, which may use a Laplace filter, a Sobel filter, a canny filter, and/or any other edge detection filters known in the art.

For example, a Sobel filter may be used to find edges and calculate edge strengths. In some cases, the Sobel filter may use a pair of 3×3 convolution masks which estimate the gradient in the x-direction (columns) and in the y-direction (rows). Mx and My, shown below, are such convolution masks:

| Mx = | [−1 0 1]<br>[−2 0 2]<br>[−1 0 1] | My = | [1 2 1]<br>[0 0 0]<br>[−1 −2 −1] |
|---|---|---|---|

Accordingly, the gradients in the x-direction and the y-direction, Gx and Gy respectively, can be found by convolving the convolution masks with the image. For example Gx=Mx*Image and Gy=My*Image. Thus, the edge strength G at each point may be calculated by the formula $G=\sqrt{(Gx^2+Gy^2)}$. The edge direction θ may also be calculated at each pixel by the formula θ=a tan 2 (Gy, Gx).

Other methods may also be used for finding an edge, calculating edge strengths, and/or finding an edge direction. For example, tensors (e.g., a gradient structure tensor) may be used. Typically, a tensor of an image may be a structure tensor that is a 2×2 matrix of image gradient functions. As should be appreciated by one having ordinary skill in the art, the eigenvalues and eigenvectors of the structure tensor may be used to find the edge direction and edge strength in the neighborhood of a pixel. In some embodiments of this disclosure, 4-tap filters may be used as tensors. Each 4-tap filter operates on nine 2×2 patches in the same neighborhood, which may be structure tensors that are 2×2 matrices of gradient functions.

Figure 8B:
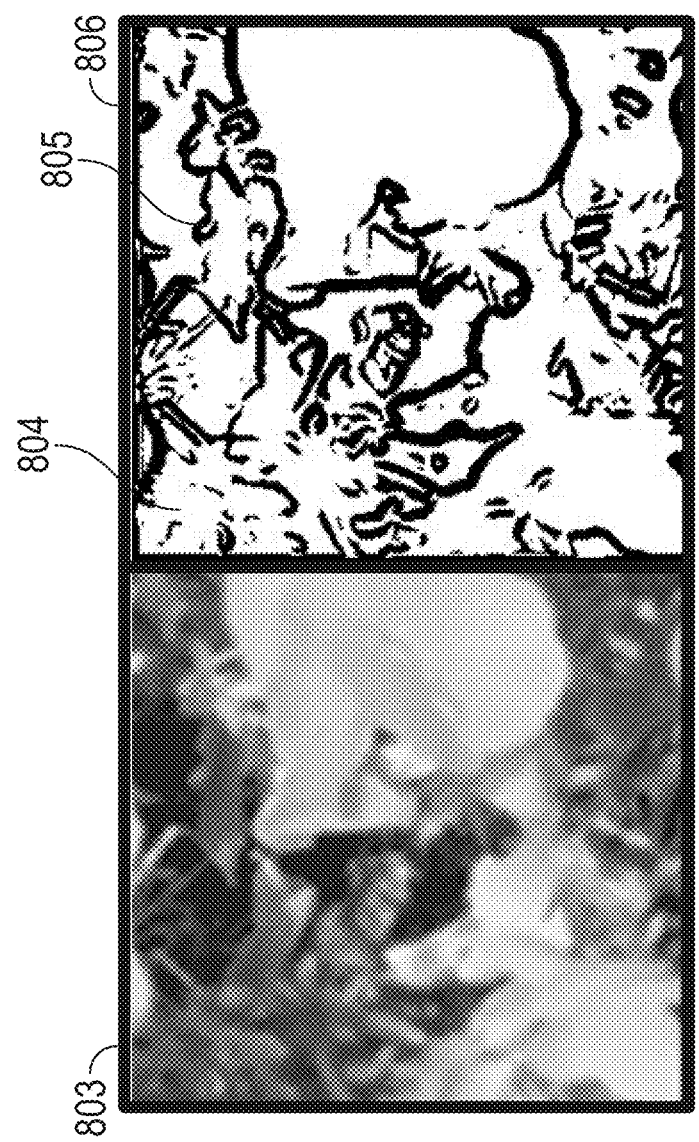
FIG. 8B illustrates an example edge map 806 of source image 803.

An edge map can be created from the calculated edge strength at each point in an image. FIG. 8B illustrates an example edge map 806 of source image 803. Edge map 806 shows edges corresponding to pixels in source image 803. Edge map 806 may have the same dimensions as source image 803. Accordingly, each pixel of edge map 806 may have a value proportional to the edge strength measurement at each pixel of source image 803. In some cases, the edge strength may be a scaled number between 0 and 1. In other cases, the edge strength may also be a number in any range of numbers. The edge strengths may also be represented by letters and/or numbers. A person having ordinary skill in the art should appreciate that there are any number of ways of representing edge strengths, and any particular way may be multiplied, divided, transformed, and/or otherwise altered using elementary mathematical techniques.

Edge map 806 may also store information about edge directions, or orientation, of each of its pixels, which may be used in a directional upscaler, such as directional upscaler 703 (FIG. 7). Along any edge direction, the pixel colors in that edge direction remain constant or change gradually. However, across the edge direction, pixel colors change sharply. As previously described, edge map 806 computes an edge strength and edge direction at each pixel direction.

Edge map 806 is an example visual representation of an edge map. It should be noted that in some cases, an entire edge map, such as edge map 806, might not be generated at one time. Instead, the computation could pass each pixel, or groups of pixels, for calculation without assembling an entire edge map at one time. In edge map 806, the darker pixels, such as pixel 805, are stronger edges (e.g., points of sharp transition). The lighter areas, such as pixel 804, are places of weaker and/or no edges.

Continuing with FIG. 8A, in some embodiments, directional upscaler 703 takes into account edge directions when interpolating by giving pixels along an edge more weight than pixels across an edge in calculating the pixel color of an interpolated pixel. For example, directional interpolator 703 may detect straight edges and their orientation and use linear interpolation along the edges to preserve the edges. In some cases, directional upscaler 703 may use a weighted average to compute the pixel color of an interpolated pixel based on the pixels in the window of pixels. In taking the weighted average, directional upscaler 703 may find the dominant edge direction of the pixels in the window of pixels. For example, the dominant edge direction of the pixels in the window of pixels may be the direction of the majority of the pixels, an average of the edge directions of the pixels, and/or any other way of calculating the dominant edge direction known in the art. The weighted average assigns weights to each pixel color of the pixels in the window of pixels based on how close the edge direction of the pixel is to the dominant edge direction.

The window of image pixels moves around the selected region 601 in a predefined manner such that the input image containing M×N pixels results in output image 802, which has a number of pixels greater than M×N.

Output image 802 is an upscaled version of selected region 601. It should be noted, as previously mentioned, that directional upscaler 703 may operate on an entire image, regions of images, groups of pixels, individual pixels, and/or delta images and delta values. For example, memory and computational costs may be saved in some instances by processing only groups of pixels at a time.

Figure 9A:
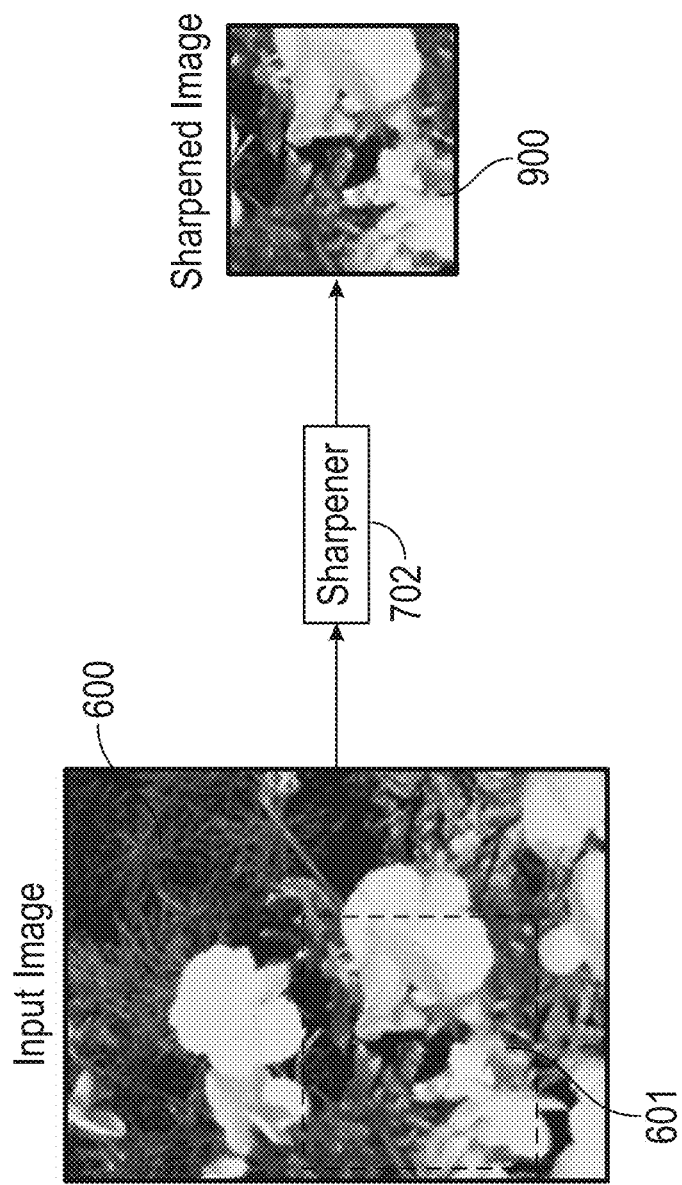
FIG. 9A illustrates an example of sharpening an input image.

FIG. 9A illustrates an example of sharpening an input image. Input image 600, more specifically selected region 601, is inputted into sharpener 702. Sharpener 702 may use any image sharpening process known in the art, such as high pass filtering, unsharp masking, non-local means, bilateral, trilateral, etc. After passing through sharpener 702, sharpened image 900 is outputted. Again, sharpener 702 may operate on an entire image, regions of images, groups of pixels, individual pixels, and/or delta images and delta values.

For example, at this stage, in some embodiments, sharpened image 900 may be a delta image, wherein each pixel represents the difference between the pixel intensity of a sharpened pixel in sharpened image 900 and a corresponding pixel in selected region 601 of FIG. 8A. In some cases, the delta image and/or delta values may be generated by sharpener 702 by low pass filtering the pixels of selected region 601 and subtracting them from the corresponding pixels of the original selected image 601.

Figure 9B:
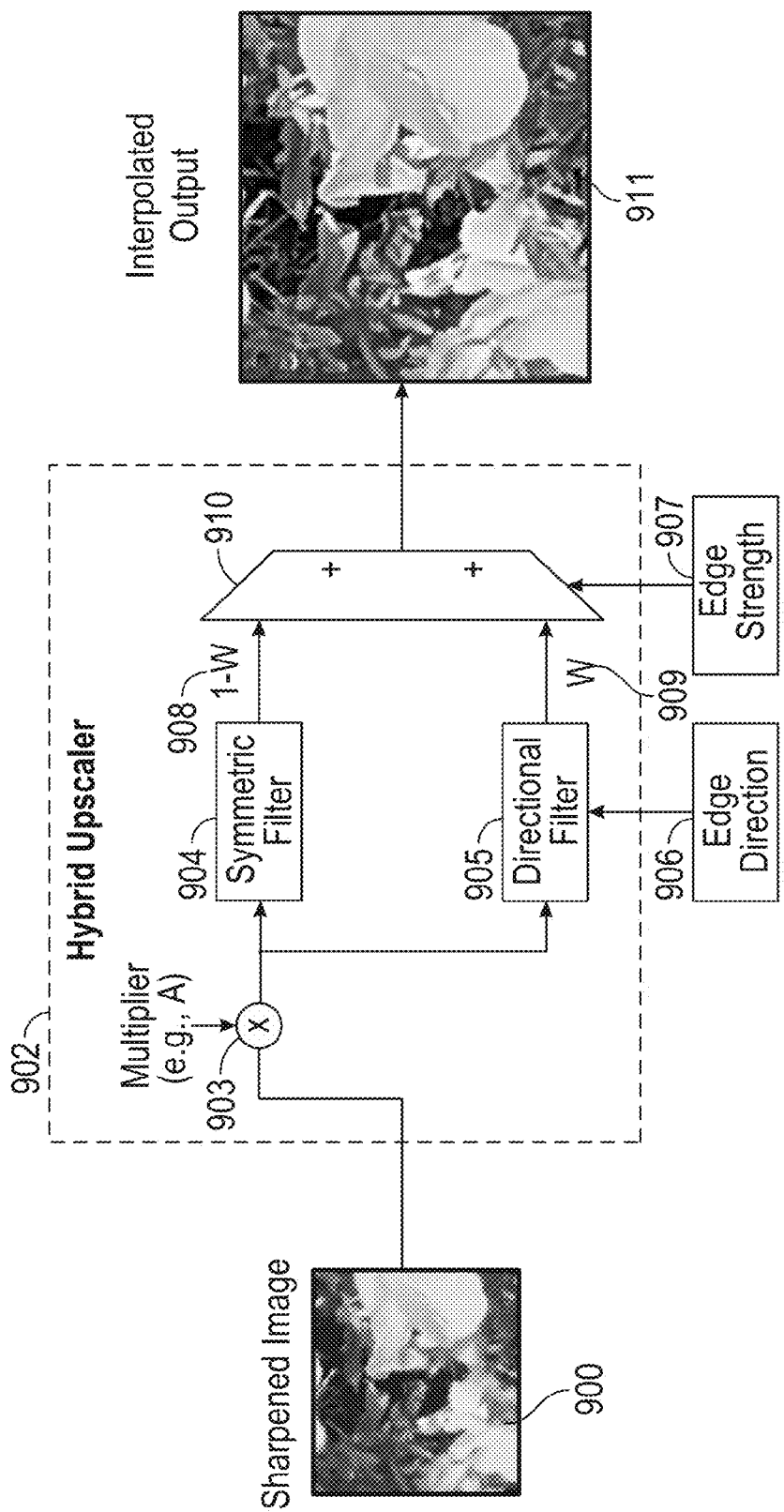
FIG. 9B illustrates an example of sharpening an image using an embodiment of a hybrid upscaler.

FIG. 9B illustrates an example of sharpening an image using an embodiment of a hybrid upscaler. Sharpened image 900 is passed through hybrid upscaler 902. In this example, sharpened image 900 first goes through multiplier 903. Multiplier 903 may increase the intensity of the pixels of sharpened image 900 by a factor of A (e.g., multiply the pixel colors of sharpened image 900 by A). The now multiplied sharpened image 900 goes through two processes in parallel. The first process is symmetric filter 904, which may be any kind of symmetric filter known in the art. For example, symmetric filter 904 may use an averaging kernel that averages the pixel colors of nearby pixels to compute the pixel color of the interpolated pixel. In some cases, the averaging kernel may weigh the pixels by their spatial distance away from the interpolated pixel. In some embodiments, symmetric filter 904 may be an isotropic filter, which uses pixel information in all directions for interpolation. It may also use bilinear, bi-cubic, or tri-linear methods. This is in contrast to directional filter 905, which runs in parallel to symmetric filter 904. Directional filter 905 uses edge direction 906 (which may comprise of the edge direction of each pixel) to perform directional interpolation. For example, directional filter 905 may be directional upscaler 703 (FIG. 8A).

Symmetric filter 904 and directional filter 905 may also be filters of any number of taps. The tap of a filter is related to the size of the filter used (e.g., the number of pixels it uses for interpolation). For example, symmetric filter 904 and directional filter 905 may be four tap filters meaning that they are 4×4 filters. Symmetric filter 904 and directional filter 905 may also have varying coefficients as desired. In some cases, these coefficients may be static and/or stored in memory. In other cases, the coefficients may be calculated dynamically based on the particular data passed through the filters.

As previously described, interpolation adds a number of pixels between each pixel of the original image. In this way, the images are upscaled by symmetric filter 904 and directional filter 905. In some embodiments, symmetric filter 904 and directional filter 905 add the same number of pixels between each pixel of the selected region 601. In some cases, this is the same number of pixels that directional upscaler 703 (FIG. 8A) added between the pixels of selected region 601. As a result, the outputs of symmetric filter 904, directional filter 905, and directional upscaler 703 have the same dimensions in some embodiments. However, in some embodiments, they may not have the same dimensions. In such a case, further computations in later steps may be performed, as will be later described.

The outputs of symmetric filter 904 and directional filter 905 are added together using image adder 910. In some embodiments, image adder 910 takes a weighted sum of the outputs of symmetric filter 904 and directional filter 905. In these embodiments, the weighted sum may use the edge strength 907, which may be a byproduct of directional upscaler 703 (FIG. 8A) as previously described, and give the edge strength of each pixel. The output of directional filter 905 is multiplied by weight W 909, which may be the edge strength 907 or a value derived from the edge strength 907. Similarly, the output of symmetric filter 904 is weight 1−W 908, which may be one (1) minus edge strength 907 or a value derived from edge strength 907.

In some embodiments, weight W 909 may not be the exact edge strength 907 calculated from directional upscaling 703. It may be scaled, and/or modified as desired. One of ordinary skill in the art should appreciate that using edge strength 907 in adding together the outputs of symmetric filter 904 and directional filter 905 allows more intense edges in sharpened image 900 to use relatively more directional filtering, which takes into account those edges. Indeed, symmetric filtering might cause the edges to become blurred. On the other hand, where there are not a lot of edges, symmetric filtering may be more appropriate in finding interpolated pixel colors because directional filtering may result in image artifacts. The computation may be done on entire images, regions of images, groups of pixels, individual pixels, and/or delta images and delta values. In this way, because both symmetrical filter 904 and directional filter 905 are used, hybrid interpolator 902 may be said to be blending symmetric filter 904 and directional filter 905. The output of hybrid interpolator 902 is interpolated output 911.

It should be appreciated that at this point, if interpolated output 911 is not a delta image, in some embodiments, it may be desirable to convert the image (or section of the image, groups of pixels, pixels, etc.) into a delta image. For example, upscaler 603 (FIG. 6) and/or directional upscaler 703 (FIG. 8) may be used on the selected region 601 to create an image that is the same dimensions as interpolated output 911. This created image may be subtracted from the output of hybrid upscaler 902 to create the delta image.

Figure 10:
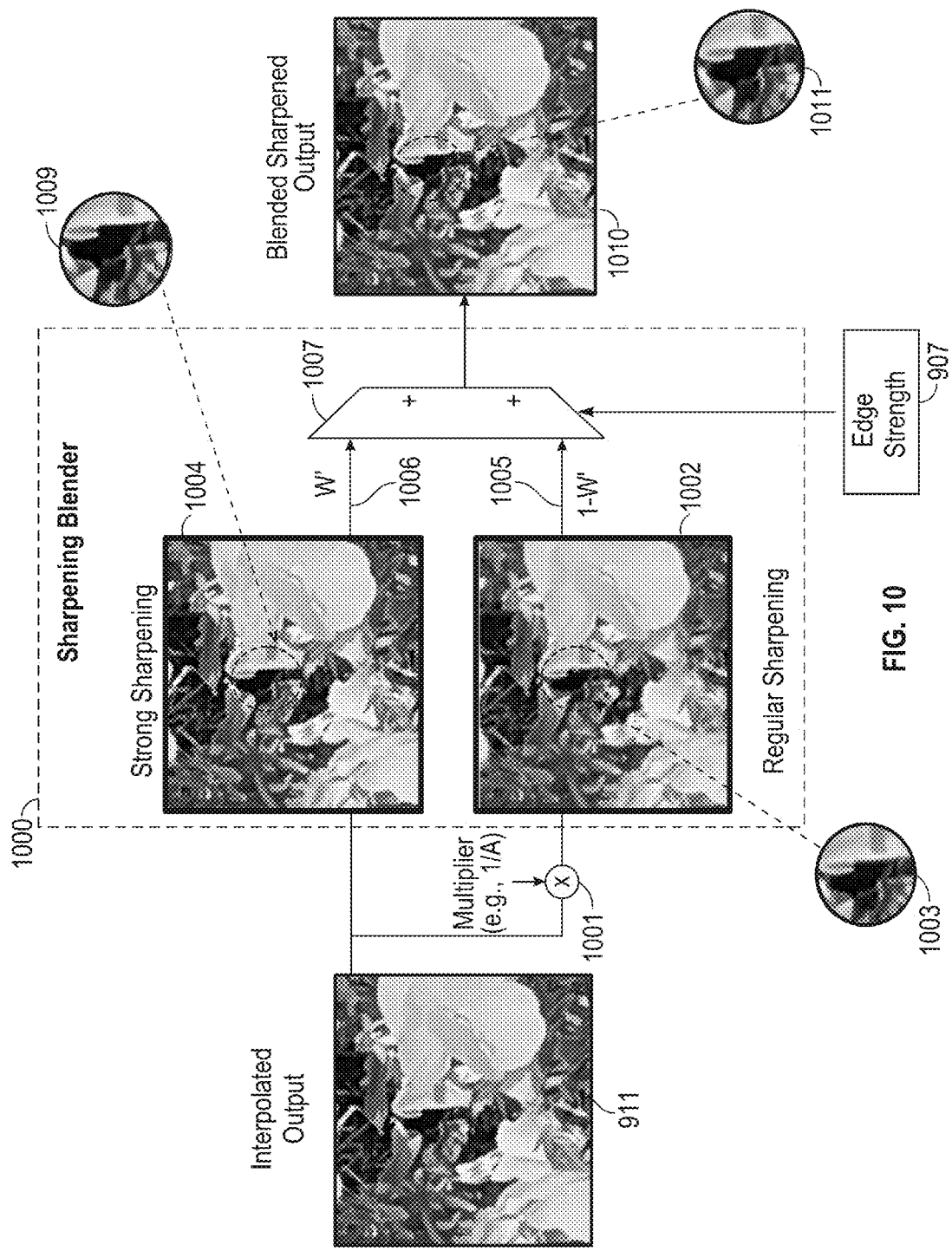
FIG. 10 is an example embodiment of a sharpening blender.

FIG. 10 is an example embodiment of a sharpening blender. The interpolated output 911 is inputted into the sharpening blender 1000. At the same time, the interpolated output 911 is inputted into multiplier 1001. In some cases, multiplier 1001 changes the pixel colors of interpolated output 911 by a factor 1/A. This factor may be related to multiplier 903 (FIG. 9B), which increased the pixel intensities by a factor A. In such a case, multiplier 1001 is the reciprocal gain of multiplier 903. In other embodiments, the multiplier 1001 may be adjusted by a factor as desired. It should be recognized that multiplier 1001 may reduce the sharpening gain of the interpolated output 911.

Accordingly, the interpolated output 911 appears as the strong sharpening image 1004 in sharpening blender 1000. Regular sharpening image 1002 is the interpolated output 911 that has gone through multiplier 1001. In some embodiments, it should be appreciated that if multiplier 1001 multiplies the pixel colors of interpolated output 911 by 1/A, which may be less than one, regular sharpening image 1002 is less sharpened as compared to strong sharpening image 1004.

Strong sharpening image 1004 and regular sharpening image 1002 are added together using image adder 1007. In these embodiments, the weighted sum may use the weight W' 1006, which may depend on edge strength 907. Edge strength 907 is inputted into image adder 1007. Regular sharpening image 1002 is weighted by weight 1−W' 1005. Similarly, strong sharpening image 1004 is weighted by weight W' 1006. Weighting in some embodiments (e.g., when weight 1−W' 1005 and weight W' 1006 are between 0 and 1) can be performed by multiplying strong sharpening image 1004 by weight W' 1006 and multiplying regular sharpening image 1002 by weight 1−W' 1005, and then adding those products together using image adder 1007. The end product is blended sharpened output 1010.

Weight W' 1006 and weight 1−W' 1005 may be calculated from edge strength 907, which may be a byproduct of directional upscaler 703 (FIG. 8A) as previously described. They may be edge strength 907 itself or a value calculated from edge strength 907. For example, weight W' 1006 may be the edge strength 907 subject to a threshold. The threshold may act as an upper boundary (e.g., a ceiling) and/or a lower boundary (e.g., a floor) on the desired relative contribution of regular sharpening image 1002 and strong sharpening image 1004. By way of illustration, weight W' 1006 may be a value between 0 and 1. Since weight W' 1006 is the relative weight of the strong sharpening image 1004, if more contribution from strong sharpening image 1004 in the blended sharpened output 1010 were desirable, one could place a threshold floor on weight W' 1006 of 0.6. In this way, weight W' 1006 would be at least 0.6 (e.g., if weight W' 1006 were calculated to be 0.2 from edge strength 907, the threshold floor would increase weight W' 1006 to 0.6). Such may be desirable if one wanted to ensure a minimum level of sharpness of an output image. Similarly, one could place a threshold ceiling on weight W' 1006 of 0.6. In this way, weight W' 1006 would be at most 0.6 (e.g., if weight W' 1006 were calculated to be 0.8, the threshold ceiling would decrease weight W' 1005 to 0.6).

It should be appreciated that blended sharpened output 1010 is an image of the selected region 601 (FIG. 7) that has been processed by sharpener 702, hybrid upscaler 902, and sharpening blender 1000. It should also be appreciated that in some embodiments, blended sharpened output 1010 may actually be a delta image. It should also be appreciated that blended sharpened output 1010 may be an entire image, region of an image, groups of pixels, and/or individual pixels.

Image 1003 magnifies a portion of regular sharpening image 1002. Image 1009 magnifies a portion of strong sharpening image 1004. As compared to image 1003, image 1009 shows sharper transitions in pixel intensity. Image 1011 magnifies a portion of blended sharpened output 1010. Image 1011 shows more details and less washed out artifacts for texture regions than in image 1009, but sharper transitions than in image 1003.

Figure 11A:
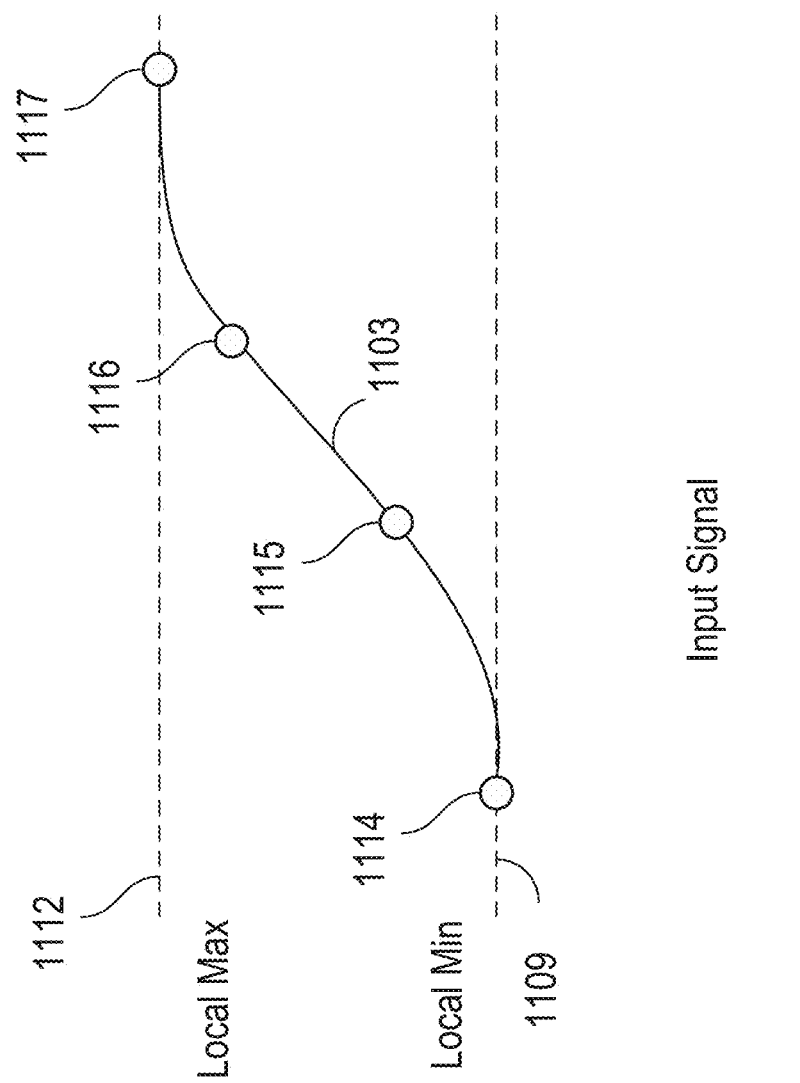
FIG. 11A-11C illustrates example halo overshoots that can occur when an image is sharpened.
Figure 11B:
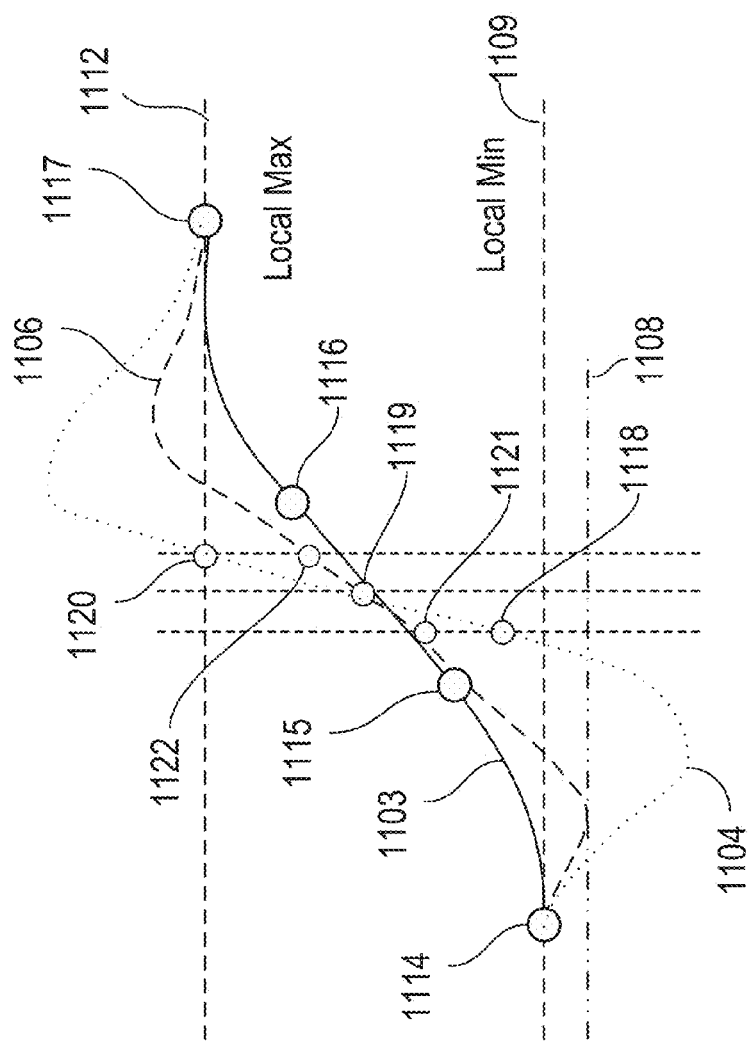
Figure 11C:
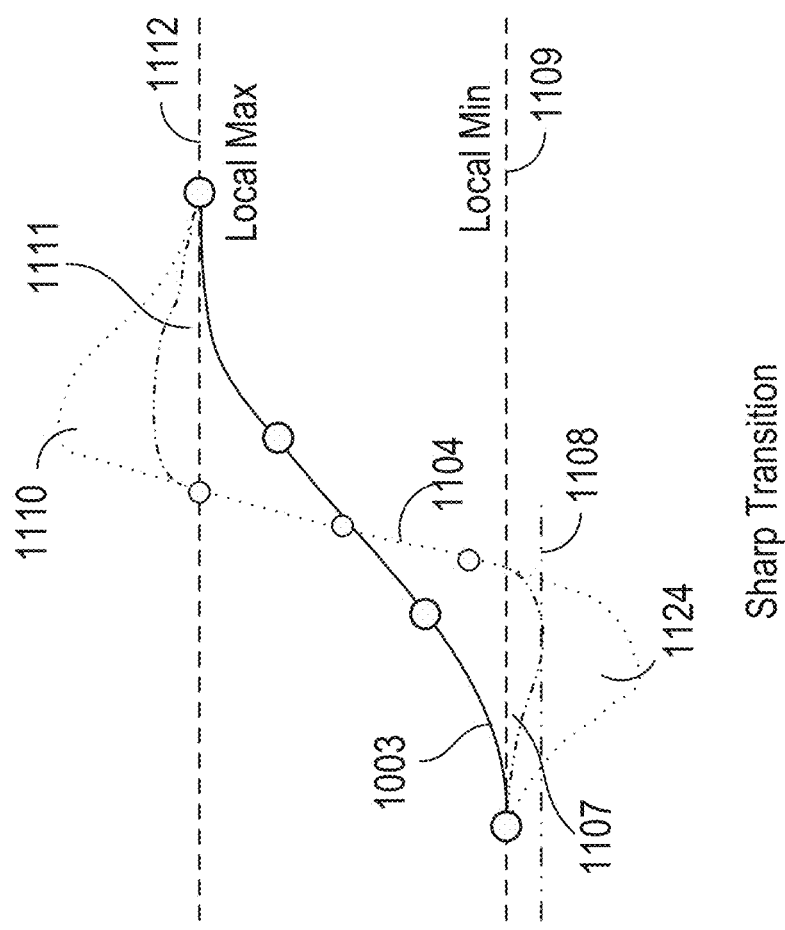

FIG. 11A-11C illustrates example halo overshoots that can occur when an image is sharpened. FIG. 11A shows input signal 1103, which has four illustrated pixels, pixels 1114, 1115, 1116, and 1117. The illustrated line connecting these four pixels of input signal 1103 is used for illustrative purposes, however, the actual input signal 1103 may consist of only discrete pixels. Noticeably, pixels 1114, 1115, 1116, and 1117 together show an area of transition, where the pixel color of the pixels changes rapidly in the image (increasing from left to right). As such, sharpening input signal 1103 will result in an even sharper transition. Local minimum 1109 shows the pixel color of pixel 1114, which has the lowest pixel color of the illustrated pixels. Local maximum 1112 shows the pixel color of pixel 1117, which has the highest pixel color of the illustrated pixels.

FIG. 11B shows input signal 1103 along with two levels of sharpening, strong sharpening signal 1104 and regular sharpening signal 1106. These two levels of sharpening are shown over the same segment of the image as input signal 1103. Because the sharpened image has been upscaled, strong sharpening signal 1104 and regular sharpening signal 1106 have additional pixels between the pixels of the input signal 1103. For example, between pixel 1115 and pixel 1116 of input signal 1103, strong sharpening signal 1104 has pixels 1118, 1119, and 1120. Similarly, regular sharpening signal 1106 has pixels 1121, 1119, and 1122 between pixels 1115 and 1116 of input signal 1103. In some embodiments, regular sharpening signal 1106 may be a section of regular sharpening image 1002 (FIG. 10) and strong sharpening signal 1104 may be a section of strong sharpening image 1004 (FIG. 10). Noticeably, regular sharpening signal 1106 has sharper transitions than input signal 1103, as seen by its steeper curve through pixels 1121, 1119, and 1122. Strong sharpening signal 1104 has an even sharper transition than regular sharpening signal 1106 in that same interval as seen through the steeper curve through pixels 1118, 1119, and 1120.

FIG. 11C illustrates the overshoots that may occur when strong sharpening is used. Strong sharpening signal 1104 has overshoot region 1124 where the representative curve goes way below local minimum 1109. Similarly, strong sharpening signal 1104 has overshoot region 1110 where the representative curve goes way above local maximum 1112. The result of these overshoots is an unnatural appearance with pixel colors that look artificial. In some embodiments, the overshoot regions 1110 and 1124 may be suppressed in order to reduce their artificial appearance. For example, overshoot region 1110 may be suppressed to the shape seen in region 1111. Similarly overshoot region 1124 may be suppressed to the shape seen in region 1107. By way of illustrative example, the reduced halo magnitude 1108, which represents the local minimum of region 1107, is the same local minimum of regular sharpening signal 1106 (shown in FIG. 11B). A similar comparison can be made of the local maximum of region 1111 and regular sharpening signal 1106.

In some embodiments, dynamic clamping may be used. Dynamic clamping does not allow strong sharpening signal 1104 to have pixel colors less than local minimum 1109 and/or greater than local maximum 1112 of input signal 1103. In some cases, dynamic clamping can cause washed out artifacts.

Figure 12:
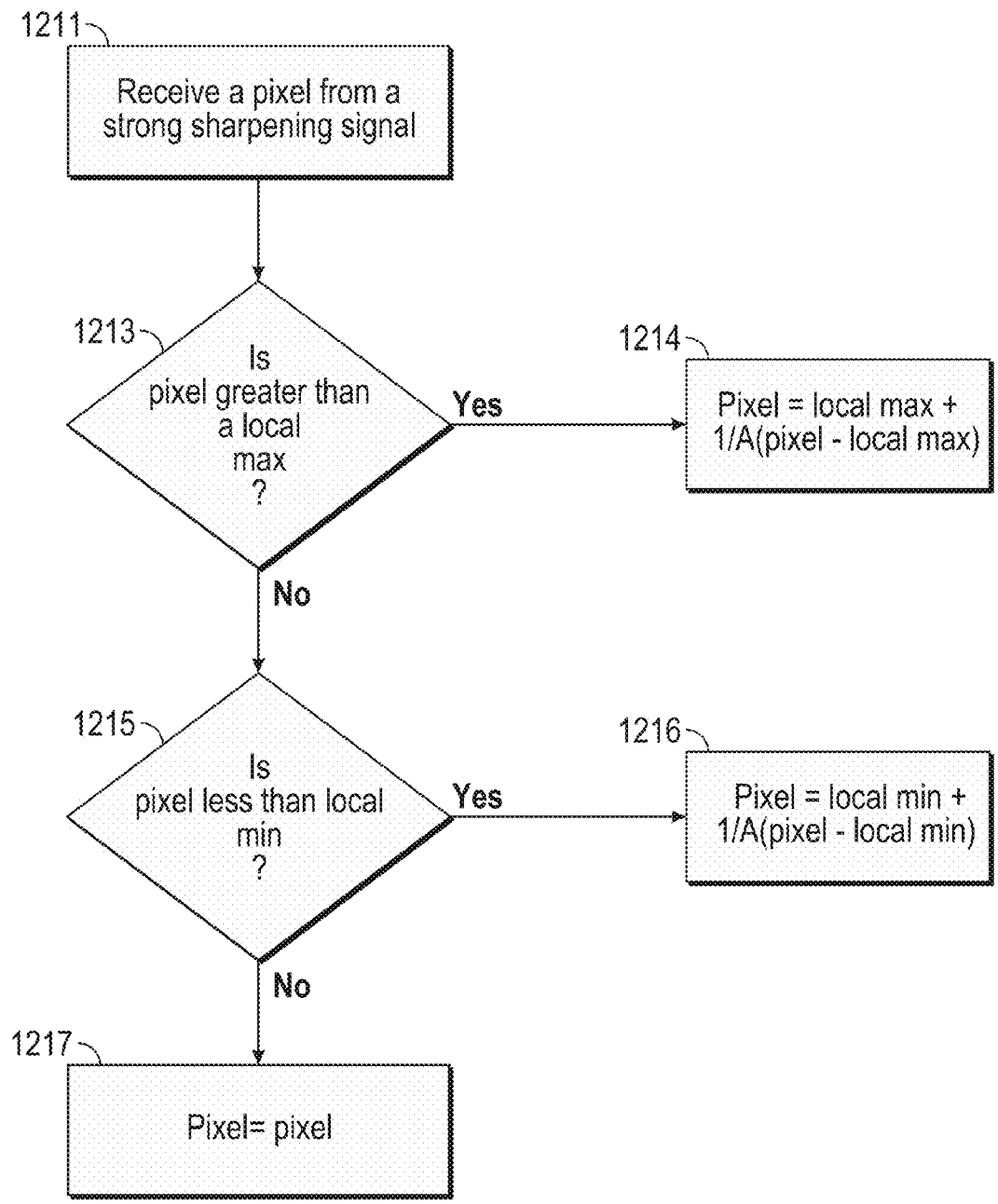
FIG. 12 illustrates an example embodiment of halo suppression.

As an alternative to dynamic clamping, FIG. 12 illustrates an example embodiment of halo suppression. Block 1211 receives a pixel from a strong sharpening signal, such as strong sharpening signal 1104. Block 1213 then sees if the received pixel is greater than a local maximum, such as local maximum 1112 from FIG. 11C. If so, then block 1214 adjusts the pixel by the formula: pixel=local maximum+1/A×(pixel−local maximum), where 1/A may be the same multiplier as multiplier 1001 from FIG. 10. In this way, a halo overshoot may be reduced by a halo reduction factor.

Otherwise, block 1215 sees if the received pixel from block 1211 is less than a local minimum, such as local minimum 1109 from FIG. 11C. If so, then the block 1216 adjusts the pixel by the formula: pixel=local minimum+1/A×(pixel−local minimum), where 1/A may be the same multiplier as multiplier 1001 from FIG. 10. In this way, a halo overshoot may be reduced by a halo reduction factor. Otherwise, block 1217 adjusts the pixel by the formula: pixel=pixel. In other words, the pixel is left unchanged.

It should be noted that the blocks in FIG. 12 may operate on pixel colors of an image. If a strong sharpening signal comprises of a delta image and/or delta values, it may be converted to have the pixel colors of an image (and/or region of an image, group of pixels, and/or individual pixels). For example, upscaler 603 (FIG. 6) and/or directional upscaler 703 (FIG. 8) may be used on selected region 601 to create an image that is the same dimensions as the delta image. The pixel colors of the created image may be added to pixels of the delta image to create a strong sharpening signal with pixel colors of an image. After halo suppression is performed on the strong sharpening signal, it may be converted back to a delta image and/or delta values by any method described in this disclosure or known in the art.

As another example, output image 802 (FIG. 8A), which is the output of directional upscaler 703 running in parallel, may be added to the delta images and/or delta values of the strong sharpening and regular sharpening signals. The sum of the strong sharpening delta image and output image 802 may then undergo halo suppression. An enhanced digital zoom image may then be generated by taking the weighted average of the output of the halo suppression and the sum of the regular sharpening delta image and output 802.

The halo suppression technique of FIG. 12, and/or any other halo suppression technique discussed in this disclosure and/or known in the art, can be used on a strong sharpening signal/image to enhance it. For example, halo suppression may be performed on strong sharpening signal 1104 (FIG. 11B) and/or strong sharpening image 1004 (FIG. 10). In the case of strong sharpening image 1004, halo suppression may be performed before strong sharpening image 1004 is passed to image adder 1007. Halo suppression may also be delayed until after strong sharpening image 1004 and regular sharpening image 1002 have passed to image adder 1007. In these embodiments, halo suppression is performed on blended sharpened output 1010.

Figure 13:
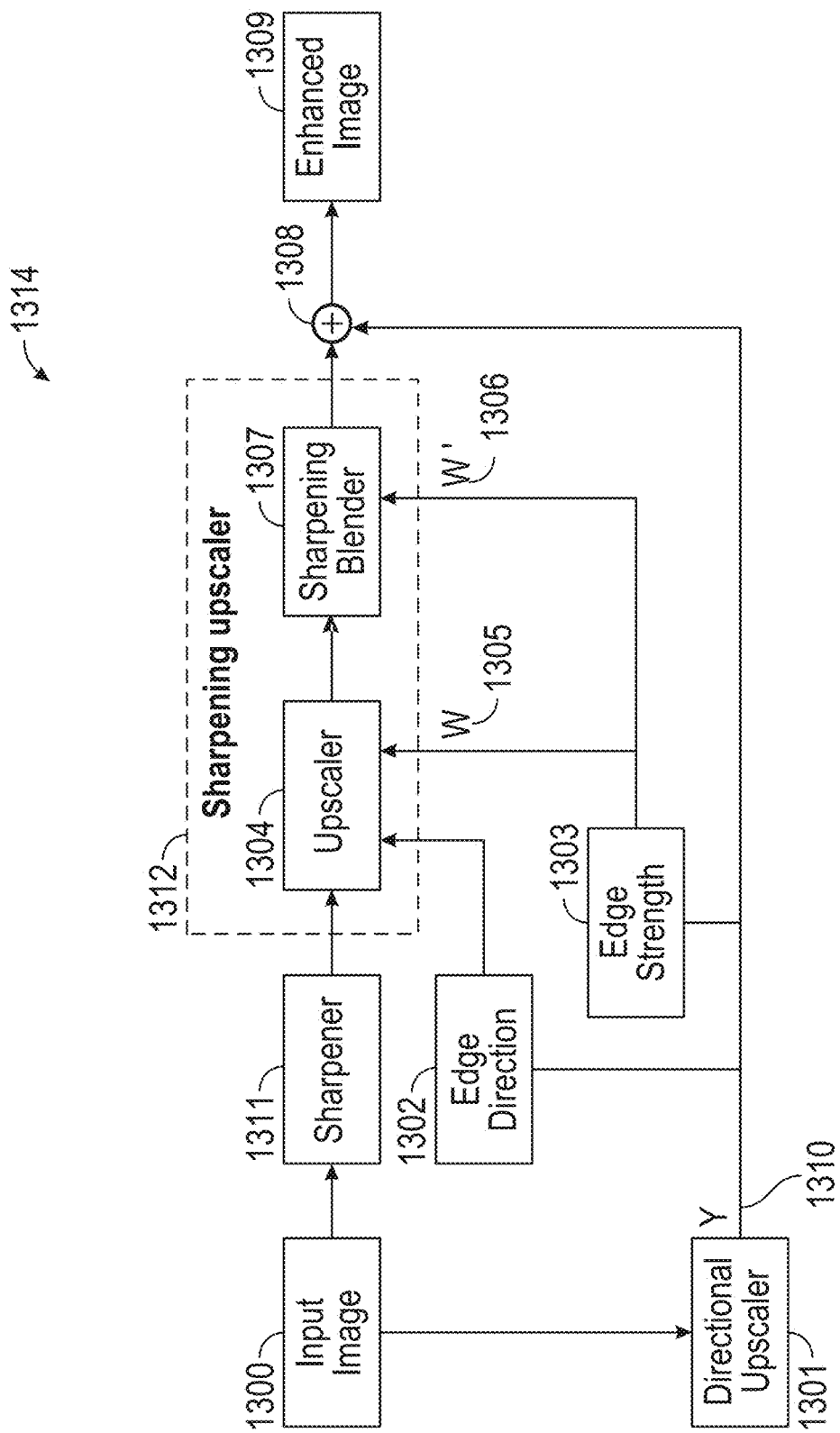
FIG. 13 illustrates a flowchart diagram according to an example embodiment.

FIG. 13 illustrates a flowchart diagram according to an example embodiment. Flowchart diagram 1314 is a more detailed flowchart of flowchart 700 shown in FIG. 7. Input image 1300 is inputted into directional upscaler 1301 and sharpener 1311 in parallel. Directional upscaler has output Y 1310. The output of sharpener 1311 goes into sharpening upscaler 1312. Sharpening upscaler 1312 comprises of upscaler 1304 and sharpening blender 1307. Upscaler 1304 receives edge direction 1302 and weight W 1305, which is derived from edge strength 1303. Edge direction 1302 and edge strength 1303 are products of the directional upscaler 1301. Upscaler 1304 may be hybrid upscaler 902 (FIG. 9B) or any other upscaler discussed in this disclosure or known in the art. Sharpening blender 1307 receives weight W' 1306, which is also derived from edge strength 1303. Sharpening blender 1312 may be sharpening blender 1000 (FIG. 10) or any other sharpening blender discussed in this disclosure or known in the art. The output of sharpening upscaler 1312 is added to the output of directional upscaler 1301 using image adder 1308.

It should be appreciated that in some embodiments, the output of sharpening upscaler 1312 is a delta image with the same dimensions as output Y 1310. As such, image adder 1308 adds together each pixel of the delta image with each pixel of output Y 1310 to produce the enhanced image 1309. Indeed, in some embodiments, images, regions of images, groups of pixels, and/or individual pixels may be passed through flowchart diagram 1314.

Where the output of sharpening upscaler 1312 is not a delta image, it may be turned into a delta image. For example, input image 1300 may be separately upscaled using any upscaling technique known in the art (e.g., upscaler 603 illustrated in FIG. 6) such that it has the same dimensions as sharpening upscaler 1312. The pixel color of each of the pixels of the separately upscaled image may be subtracted from the pixel colors of the pixels from the output of sharpening upscaler 1312. This subtraction would form a delta image that could be added to output Y 1310 to produce enhanced image 1309.

In some embodiments, the output of sharpening upscaler 1312 (whether images, regions of images, groups of pixels, and/or individual pixels) might not have the same dimensions as output Y 1310. In such a case, image adder may perform additional interpolation and/or averaging in order to add the images.

Figure 14:
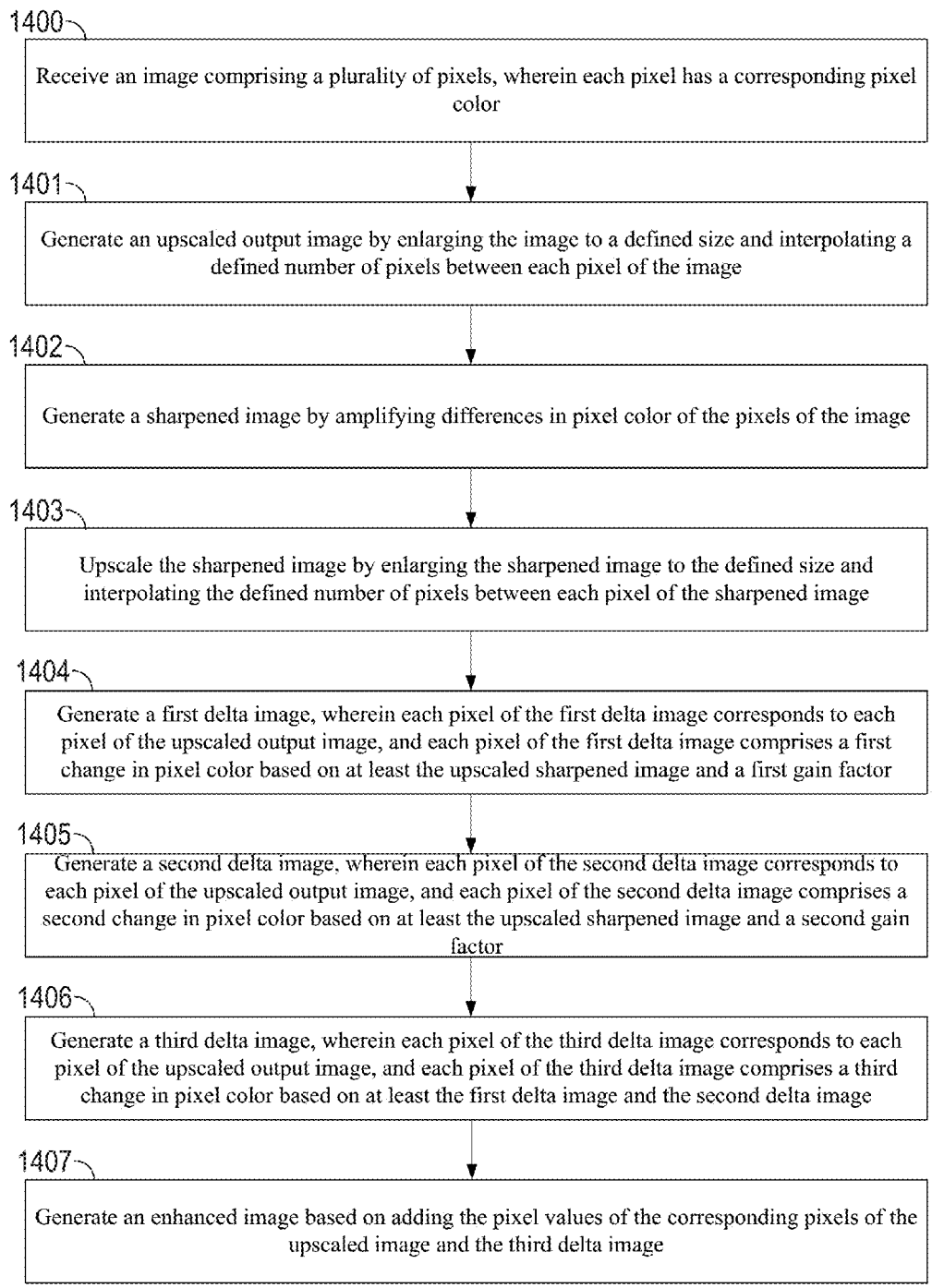
FIG. 14 is a flow diagram for a method according to an example embodiment.

FIG. 14 is a flow diagram for a method according to an example embodiment. In block 1400, the method receives an image comprising a plurality of pixels, wherein each pixel has a corresponding pixel color. In block 1401, the method generates an upscaled output image by enlarging the image to a defined size and interpolating a defined number of pixels between each pixel of the image. In block 1402, the method generates a sharpened image by amplifying differences in pixel color of the pixels of the image. In block 1403, the method upscales the sharpened image by enlarging the sharpened image to the defined size and interpolating the defined number of pixels between each pixel of the sharpened image. In block 1404, the method generates a first delta image, wherein each pixel of the first delta image corresponds to each pixel of the upscaled output image, and each pixel of the first delta image comprises a first change in pixel color based on at least the upscaled sharpened image and a first gain factor. In block 1405, the method generates a second delta image, wherein each pixel of the second delta image corresponds to each pixel of the upscaled output image, and each pixel of the second delta image comprises a second change in pixel color based on at least the upscaled sharpened image and a second gain factor. In block 1406, the method generates a third delta image, wherein each pixel of the third delta image corresponds to each pixel of the upscaled output image, and each pixel of the third delta image comprises a third change in pixel color based on at least the first delta image and the second delta image. In block 1407, the method generates an enhanced image based on adding the pixel values of the corresponding pixels of the upscaled image and the third delta image.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps or blocks described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps or blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps or blocks of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps or blocks in any disclosed process is an example of a sample approach. Based upon design preferences, it is understood that the specific order or hierarchy of steps or blocks in the processes may be rearranged while remaining within the scope of the present disclosure. The accompanying method claims present elements of the various steps or blocks in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An imaging system, comprising:
   an image upscaling module configured to receive an input image comprising a plurality of pixels that have corresponding pixel values, and to generate an upscaled output image by enlarging the input image to a defined size and interpolating a defined number of pixels between each pixel of the input image;
   a sharpening module configured to generate a sharpened image by amplifying differences in pixel values of the pixels of the input image;
   a sharpening upscaling module configured to:
      upscale the sharpened image by enlarging the sharpened image to the defined size and interpolating the defined number of pixels between each pixel of the sharpened image,
      generate a first delta image, each pixel of the first delta image corresponding to each pixel of the upscaled output image, and each pixel of the first delta image comprising a first change in pixel value based on at least the upscaled sharpened image and a first gain factor,
      generate a second delta image, each pixel of the second delta image corresponding to each pixel of the upscaled output image, and each pixel of the second delta image comprising a second change in pixel color based on at least the upscaled sharpened image and a second gain factor, and
      generate a third delta image, each pixel of the third delta image corresponding to each pixel of the upscaled output image, and each pixel of the third delta image comprising a third change in pixel value based on at least the first delta image and the second delta image; and
   a processing module configured to generate an enhanced image based on adding the pixel values of the corresponding pixels of the upscaled image and the third delta image.

2. The system of claim 1, wherein the first gain factor is greater than the second gain factor.

3. The system of claim 2, wherein a pixel of the first delta image is reduced by a first halo reduction factor when a sum of the pixel of the first delta image and a corresponding pixel of the upscaled output image is greater than a local maximum of pixel color of the image.

4. The system of claim 2, wherein a pixel of the first delta image is increased by a second halo reduction factor when a sum of the pixel of the first delta image and a corresponding pixel of the upscaled output image is less than a local minimum of pixel color of the image.

5. The system of claim 1, further comprising at least one of a camera configured to take the image and a memory configured to store the image.

6. The system of claim 1, wherein the image upscaling module is further configured to generate an edge strength associated with each pixel of the upscaled output image.

7. The system of claim 6, wherein the generation of the third delta image is based on a weighted average of the first delta image and the second delta image.

8. The system of claim 7, wherein the weighted average is further based on the edge strength.

9. The system of claim 1, wherein amplifying differences in pixel color comprises using a high pass filter.

10. An imaging method, comprising:
   receiving, at a memory circuit, an image comprising a plurality of pixels, wherein each pixel has a corresponding pixel color;
   generating, with the processor, an upscaled output image by enlarging the image to a defined size and interpolating a defined number of pixels between each pixel of the image;
   generating, with the processor, a sharpened image by amplifying differences in pixel color of the pixels of the image;
   upscaling, with the processor, the sharpened image by enlarging the sharpened image to the defined size and interpolating the defined number of pixels between each pixel of the sharpened image;
   generating, with the processor, a first delta image, wherein each pixel of the first delta image corresponds to each pixel of the upscaled output image, and each pixel of the first delta image comprises a first change in pixel color based on at least the upscaled sharpened image and a first gain factor;
   generating, with the processor, a second delta image, wherein each pixel of the second delta image corresponds to each pixel of the upscaled output image, and each pixel of the second delta image comprises a second change in pixel color based on at least the upscaled sharpened image and a second gain factor;

generating, with the processor, a third delta image, wherein each pixel of the third delta image corresponds to each pixel of the upscaled output image, and each pixel of the third delta image comprises a third change in pixel color based on at least the first delta image and the second delta image; and generating, with the processor, an enhanced image based on adding the pixel values of the corresponding pixels of the upscaled image and the third delta image.

11. The method of claim 10, wherein the first gain factor is greater than the second gain factor.

12. The method of claim 11, further comprising reducing a pixel of the first delta image by a first halo reduction factor when a sum of the pixel of the first delta image and a corresponding pixel of the upscaled output image is greater than a local maximum of pixel color of the image.

13. The method of claim 11, further comprising increasing a pixel of the first delta image by a second halo reduction factor when a sum of the pixel of the first delta image and a corresponding pixel of the upscaled output image is less than a local minimum of pixel color of the image.

14. The method of claim 10, further comprising at least one of generating the image with a camera and storing the image in a memory.

15. The method of claim 10, wherein generating an upscaled output image further comprises generating an edge strength associated with each pixel of the upscaled output image.

16. The method of claim 15, wherein the generation of the third delta image is based on a weighted average of the first delta image and the second delta image.

17. The method of claim 16, wherein the weighted average is further based on the edge strength.

18. The system of claim 10, wherein amplifying differences in pixel color comprises using a high pass filter.

19. An imaging system, comprising:

means for receiving an image comprising a plurality of pixels, each pixel having a corresponding pixel color;

means for generating an upscaled output image by enlarging the image to a defined size and interpolating a defined number of pixels between each pixel of the image;

means for generating a sharpened image by amplifying differences in pixel color of the pixels of the image;

means for upscaling the sharpened image by enlarging the sharpened image to the defined size and interpolating the defined number of pixels between each pixel of the sharpened image;

means for generating a first delta image, each pixel of the first delta image corresponding to each pixel of the upscaled output image, and each pixel of the first delta image comprising a first change in pixel color based on at least the upscaled sharpened image and a first gain factor;

means for generating a second delta image, each pixel of the second delta image corresponding to each pixel of the upscaled output image, and each pixel of the second delta image comprising a second change in pixel color based on at least the upscaled sharpened image and a second gain factor;

means for generating a third delta image, each pixel of the third delta image corresponding to each pixel of the upscaled output image, and each pixel of the third delta image comprising a third change in pixel color based on at least the first delta image and the second delta image; and means generating an enhanced image based on adding the pixel values of the corresponding pixels of the upscaled image and the third delta image.

20. The system of claim 19, wherein the first gain factor is greater than the second gain factor.

21. The system of claim 19, further comprising means for reducing a pixel of the first delta image by a first halo reduction factor when a sum of the pixel of the first delta image and a corresponding pixel of the upscaled output image is greater than a local maximum of pixel color of the image.

22. The system of claim 19, further comprising means for increasing a pixel of the first delta image by a second halo reduction factor when a sum of the pixel of the first delta image and a corresponding pixel of the upscaled output image is less than a local minimum of pixel color of the image.

23. The system of claim 19, further comprising at least one of means for generating the image and means for storing the image.

24. The system of claim 19, wherein means for generating an upscaled output image further comprises means for generating an edge strength associated with each pixel of the upscaled output image.

25. The system of claim 24, wherein the generation of the third delta image is based on a weighted average of the first delta image and the second delta image.

26. The system of claim 25, wherein the weighted average is further based on the edge strength.

27. The system of claim 19, wherein amplifying differences in pixel color comprises using a high pass filter.

28. An imaging method, comprising:

receiving, at a memory circuit, an image comprising a plurality of pixels, wherein each pixel has a corresponding pixel color;

generating, with the processor, an upscaled output image by enlarging the image to a defined size and interpolating a defined number of pixels between each pixel of the image;

generating, with the processor, a sharpened portion of the image by amplifying differences in pixel color of the pixels of the image;

generating, with the processor, a delta image comprising a plurality of delta pixels, each pixel of the plurality of delta pixels having a corresponding change in pixel color between the sharpened image and the image;

upscaling, with the processor, the delta image by enlarging the delta image to the defined size and interpolating the defined number of pixels between each pixel of the sharpened image; and generating, with the processor, an enhanced image based on adding the pixel values of the corresponding pixels of the upscaled image and the delta image.

29. The method of claim 28, further comprising reducing a pixel of the delta image by a first halo reduction factor when a sum of the pixel of the delta image and a corresponding pixel of the upscaled output image is greater than a local maximum of pixel color of the image.

30. The method of claim 28, further comprising increasing a pixel of the delta image by a second halo reduction factor when a sum of the pixel of the first delta image and a corresponding pixel of the upscaled output image is less than a local minimum of pixel color of the image.

* * * * *